US010277642B2

(12) United States Patent
Lindsay et al.

(10) Patent No.: US 10,277,642 B2
(45) Date of Patent: Apr. 30, 2019

(54) COMPOSER INTERFACE FOR PROVIDING CONTENT TO A SOCIAL NETWORK

(71) Applicant: Facebook, Inc., Menlo Park, CA (US)

(72) Inventors: Robert Taaffe Lindsay, San Francisco, CA (US); Samuel Lessin, Palo Alto, CA (US); Justin Alexander Shaffer, Menlo Park, CA (US); Nicholas Felton, Brooklyn, NY (US); Ryan Case, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 401 days.

(21) Appl. No.: 13/764,632

(22) Filed: Feb. 11, 2013

(65) Prior Publication Data

US 2014/0229856 A1    Aug. 14, 2014

(51) Int. Cl.
*G06F 3/048* (2013.01)
*H04L 29/06* (2006.01)
*H04L 29/08* (2006.01)
*G06Q 50/00* (2012.01)

(52) U.S. Cl.
CPC .......... *H04L 65/403* (2013.01); *G06Q 50/01* (2013.01); *H04L 67/306* (2013.01)

(58) Field of Classification Search
CPC .... H04L 67/22; H04L 12/588; G06F 17/3089
USPC ........................................ 715/751, 753, 780
See application file for complete search history.

(56) References Cited

U.S. PATENT DOCUMENTS

| 8,239,364 | B2   | 8/2012  | Wable et al. |
|-----------|------|---------|--------------|
| 8,316,056 | B2   | 11/2012 | Wable |
| 2011/0016421 | A1* | 1/2011 | Krupka ............... G06F 17/27 715/780 |
| 2012/0041793 | A1* | 2/2012 | Farina et al. .............. 705/5 |
| 2012/0166532 | A1  | 6/2012  | Juan et al. |
| 2013/0073632 | A1  | 3/2013  | Fedorov et al. |
| 2015/0127748 | A1* | 5/2015  | Buryak ............ G06F 17/30867 709/206 |

* cited by examiner

*Primary Examiner* — Phuong H Nguyen
(74) *Attorney, Agent, or Firm* — Fenwick & West LLP (57) ABSTRACT

A composer interface provided by a social networking system allows a user to provide input, such as text data, to the social networking system. The composer interface allows the user to identify an action and/or an object related to the input. An action is structured data describing a relationship between objects defined by the social networking system. Based on the action identified as related to the input, the social networking system stores an association between the received input and the identified action.

14 Claims, 4 Drawing Sheets

COMPOSER INTERFACE FOR PROVIDING CONTENT TO A SOCIAL NETWORK

BACKGROUND

This invention relates generally to social networking systems and in particular to obtaining structured objects and actions on a social networking system.

Social networking systems, or social utilities that track and enable connections between users (including people, businesses, and other entities), have become prevalent in recent years. These social networking systems allow users to more efficiently communicate information. For example, a social networking system user may post contact information, background information, job information, hobbies, and/or other user-specific data to the social networking system. Other users may then review the posted data by browsing user profiles or searching for profiles including specific data. Social networking systems also allow users to associate themselves with other users, creating a web of connections among the users of the social networking system. The social networking system may use these connections to provide users with more relevant information.

While social networking systems capture and store information describing actions taken by their users, certain types of interactions are unable to be adequately captured by conventional social networking systems. For example, real-world social interactions, such as driving across the country, visiting landmarks, or listening to a soundtrack while travelling, are unable to be adequately captured by conventional social networking systems. While users may provide information describing these real-world interactions, this information is generally provided as unstructured data, which may be provided in different formats by different users. For example, different users may use different words to describe an interaction, making it difficult to determine if different users are referring to the same action. While user information may be processed, processing unstructured data is challenging and may lead to significant errors.

SUMMARY

A social networking system allows its users to provide structured data describing actions on objects outside of the social networking system. The social networking system provides users with a composer interface allowing a user to provide input describing an action occurring outside of the social networking system. From the provided input, the social networking system generates a content item describing the action. As the user provides input, the social networking system compares portions of the input to stored data items and presents the user with candidate data items selected based on portions of the input. The user may select a presented data item for inclusion in the input. Hence, the social networking system allows the user to more easily identify stored data items corresponding to the provided input, allowing the social networking system to more accurately associate the input with stored data.

For example, a user inputs text data for a post and as words or portions of words are received, the social networking system presents users, objects, or actions stored by the social networking system based on the portion of the text data. The user may select a presented user, object, or action, and the social networking system associates the selected item with the post. This allows the social networking system to better identify stored data associated with the post, allowing the post to be more effectively used to subsequently select content for the user.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other social networking system users. Useful social information may be maintained conceptually in a "social graph" of nodes interconnected by edges. Each node in the social graph represents something that can act on and/or be acted upon by another node. Common examples of nodes include users, non-person entities, content items, groups, events, locations, messages, concepts, and any other things that can be represented by an object in a social networking system. An edge between two nodes in the social graph represents a particular kind of connection between the two nodes resulting from an action that was performed by one of the nodes on the other node.

To enable a social networking system to discover socially relevant information about objects and their interactions, user actions on objects outside of the social networking system may be integrated into the user experience on the social networking system. Third-party developers, in addition to administrators of the social networking system, may define graph actions and graph objects enabling this integration of external socially relevant information with other information maintained by the social networking system. These graph actions and graph objects provide data visualizations of the information discoverable on the social graph. In this way, interesting information about users' actions, both inside and outside of the domain of the social networking system, may be shared and compared with other users on the social networking system.

Figure 1A:
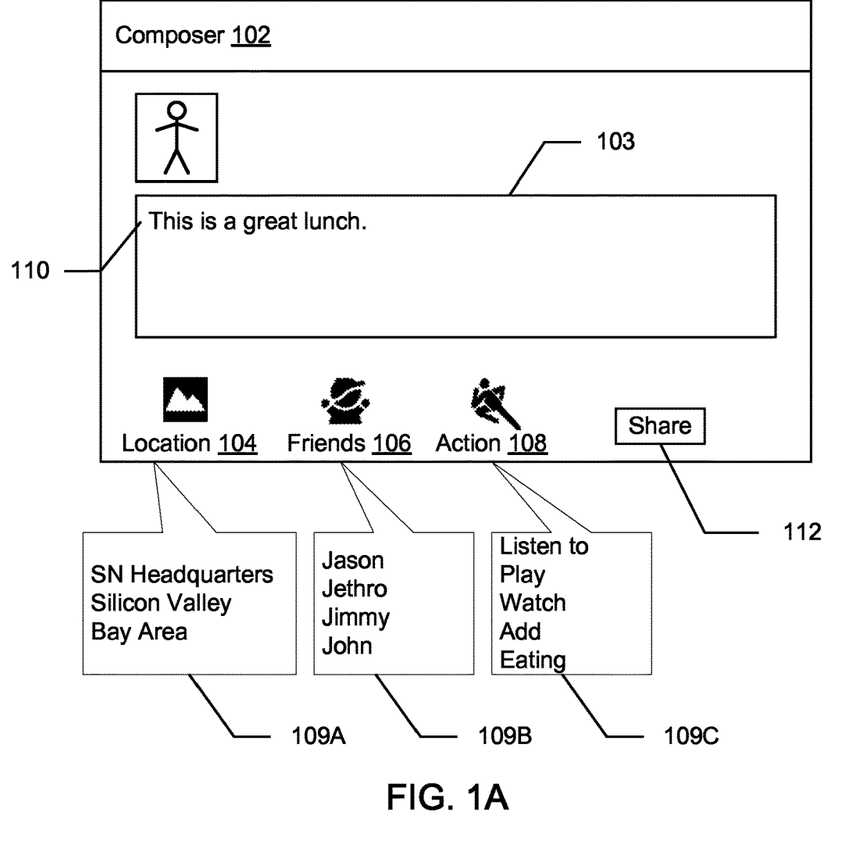
FIG. 1A is an example of a user interface for obtaining structured data from a social networking system user, in accordance with one embodiment.

FIG. 1A illustrates an example of user interface for obtaining structured data from user input received by a social networking system. The user interface includes a composer interface 102, which includes an input area 103 for receiving text input from a social networking system user. In the embodiment shown by FIG. 1A, the composer interface 102 also includes a location input 104, a user input 106, an action input 108 and a posting input 112. The user provides unstructured text data to the input area 103. In the example of FIG. 1A, a user provides the text "This is a great lunch" in the input area 103. Text data received via the input area 103 is compared to data stored by the social networking system describing users, actions, and/or objects maintained by the social networking system. In one embodiment, the received text data is compared to data stored by the social networking system as the input is received to identify stored data matching portions of the text data as it is received. For example, the received text data is compared to information associated with actions and candidate actions 109A are presented to the user via the composer 102. As described below in conjunction with FIGS. 3 and 5, the social networking system may select the candidate actions 109A based on the context of the received text input, accounting for the user providing the input, a location associated with the user, a time of day when the input is received, or other suitable information. Comparison of text data to stored data as the text data is received is further described in U.S. Pat. Nos. 8,239,364 and 8,316,056, which are each incorporated by reference herein in their entirety.

In the example of FIG. 1A, the input area 103 includes suggested input 110, which identifies data stored by the social networking system matching, or otherwise associated with, the received input. Additionally, the location input 104, the user input 106, and the action input 108 display listings of candidate locations 109A, candidate users 109B, and candidate actions 109C, respectively, based on the input received via the input area 103. For example, the listing of candidate actions 109C represents actions associated with the received input, allowing a user to readily associate an action with the received input by selecting a candidate action 109C. In one embodiment, the listings of candidate objects 109A, 109B, 109C are presented when the user accesses one of the location input 104, the user input 106, and the action input 108. Alternatively, the composer interface 102 may display a listing of candidate actions 109C, as well as listings of candidate locations 109A and/or candidate users 109B as the input is received via the input area 103. While not shown in FIG. 1A, the composer interface 102 may also display a list of candidate objects based on the received input and/or a selected action from the listing of candidate actions 109C.

By interacting with the post input 112, the user communicates the text input, and any selected listings of candidate locations 109A, candidate users 109B, and/or candidate actions 109C associated with the text input to the social networking system. Upon receiving the text input, the social networking system generates a content item, such as a post, and associates the content item with the candidate objects selected by the user. Hence, the composer interface 102 allows a user to more easily provide structured data describing actions by presenting the user with information currently maintained by the social networking system.

Figure 1B:
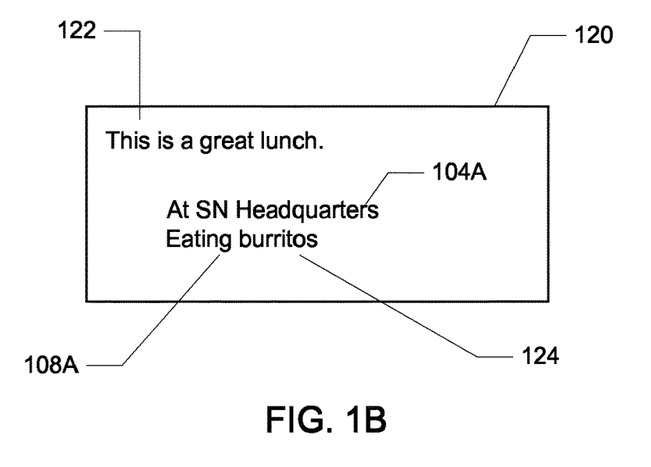
FIG. 1B is an example of a post generated from input received via the user interface, in accordance with one embodiment.

FIG. 1B is an example of a post 120 generated from input received via the composer interface 102. As shown in FIG. 1B, the post 120 includes text 122, or other content, received the input received via the input area 103. The example of FIG. 1B also shows a location 104A, an action 108A and an object 124 associated with the text 122. The location 104A, the action 108A and/or the object 124 may be selected from the listings of candidate locations 109A, candidate users 109B, candidate actions 109C, and/or a listing of candidate objects presented via the composer interface 102. Hence, the generated post 120 includes the text 122, or other content, provided by the user and may also identify an action associated with the content by the user, as well as one or more of a location, user, and/or object associated with the context by the user.

In one embodiment, the post 120 includes icons associated with the action 108A and/or the object 124 associated with the text. Additional content from certain objects 124 may also be included in the post 120. For example, am image of a page identified as the object 124 may be included in the post 120 or a title and/or a description of a page identified as the object 124 may be included in the post 120.

System Architecture

Figure 2:
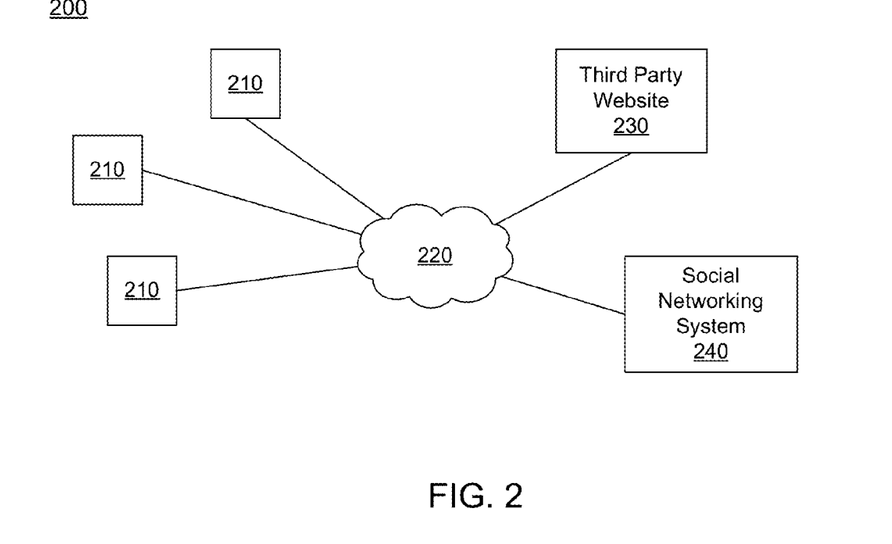
FIG. 2 is a block diagram of a system environment in which an online system operates, in accordance with an embodiment.

FIG. 2 is a high level block diagram illustrating a system environment 200 for an online system. The system environment 200 comprises one or more client devices 210, a network 220, one or more third-party websites 230, and an online system, such as a social networking system 240. In alternative configurations, different and/or additional components may be included in the system environment 200. While described with reference to the social networking system 240, the embodiments described herein may be adapted to online systems that are not social networking systems 240. For example, the online system may include an advertisement system or other system for exchanging information among its users.

A client device 210 is a computing device capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smartphone or similar device. A client device 210 is configured to communicate via the network 220. In one embodiment, a client device 210 executes an application allowing a user of the client device 210 to interact with the social networking system 240. For example, a client device 210 executes a browser application to enable interaction between the client device 210 and the social networking system 240 via the network 220. In another embodiment, a client device 210 interacts with the social networking system 240 through an application programming interface (API) that runs on the native operating system of the client device 210, such as IOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, code division multiple access (CDMA), digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

A third party website 230 may be coupled to the network 220 for communicating with the social networking system 240, which is further described below in conjunction with FIG. 3. In one embodiment, the third party website 230 is an application provider communicating information describing applications for execution by a client device 210 or communicating data to client devices 210 for presentation. The third party website 230 may also communicate information to the social networking system 240, such as advertisements or information about an application provided by the third party website 230.

Figure 3:
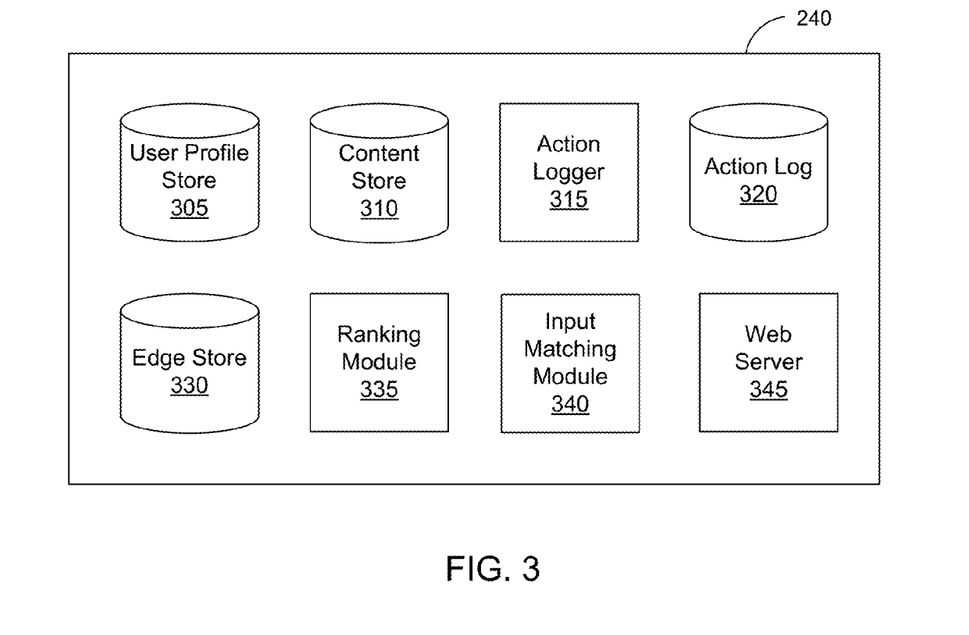
FIG. 3 is a block diagram of a social networking system, in accordance with an embodiment.

FIG. 3 is an example block diagram of an architecture of the social networking system 240. The social networking system 240 includes a user profile store 305, a content store 310, an action logger 315, an action log 320, an edge store 330, a ranking module 335, an input matching module 340, and a web server 345. In other embodiments, the social networking system 240 may include additional, fewer, or different components for various applications. Conventional components such as network interfaces, security functions, load balancers, failover servers, management and network operations consoles, and the like are not shown so as to not obscure the details of the system architecture.

Each user of the social networking system 240 is associated with a user profile, which is stored in the user profile store 305. A user profile includes declarative information about the user that was explicitly shared by the user, and may also include profile information inferred by the social networking system 240. In one embodiment, a user profile includes multiple data fields, each data field describing one or more attributes of the corresponding user of the social networking system 240. The user profile information stored in user profile store 305 describes the users of the social networking system 240. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 240 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 240, user profiles may also be stored for entities such as businesses or organizations. This allows an entity to establish a presence on the social networking system 240 for connecting and exchanging content with other social networking system users. The entity may post information about itself, about its products or provide other information to users of the social networking system 240 using a brand page associated with the entity's user profile. Other users of the social networking system 240 may connect to the brand page to receive information posted to the brand page or to receive information from the brand page. A user profile associated with the brand page may include information about the entity itself, providing users with background or informational data about the entity.

The content store 310 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 240, such as status updates, photos tagged by users to be associated with other objects in the social networking system, events, groups or applications. In some embodiments, objects are received from third-party applications, which may be external to the social networking system 240. Content "items" represent single pieces of content that are represented as objects in the social networking system 240. Users of the social networking system 240 are encouraged to communicate with each other by posting text and content items of various types of media through various communication channels, increasing the interaction of users with each other and increasing the frequency with which users interact within the social networking system 240. One or more actions may be associated with stored objects to identify types of relationships between users and objects or between objects. Different types of objects may be associated with different actions, allowing the social networking system 240 to specify object-specific actions to describe user interactions or relationships with different objects.

The action logger 315 receives communications about user actions on and/or off the social networking system 240, populating the action log 320 with information about user actions. Such actions may include, for example, adding a connection to another user, sending a message to another user, uploading an image, reading a message from another user, viewing content associated with another user, attending an event posted by another user, interacting with a link included in a news story or advertisement, among others. In some embodiments, the action logger 315 identifies interaction between a social networking system user and a brand page within the social networking system 240, which communicates targeting criteria associated with content on the brand page to a content selector to customize content from the brand page. In addition, a number of actions described in connection with other objects are directed at particular users, so these actions are associated with those users as well. These actions are stored in the action log 320.

In one embodiment, the action logger 315 additionally analyzes the logged actions to identify further information about users and/or other objects. For example, the action logger 315 may notify a user if the user performs an action at least a threshold number of times. For example, by aggregating actions performed internal to the social networking system 240 and external to the social networking system 240, the action logger 315 may more fully identify actions and patterns of a user or identify objects associated with the user. For example, if a user provides content describing watching an episode of a television show, the action logger 315 may identify the television show as an interest of the user.

The action log 320 may be used by the social networking system 240 to track user actions on the social networking system 240, as well as external websites 230 that communicate information to the social networking system 240. Users may interact with various objects on the social networking system 240, including commenting on posts, sharing links, and checking-in to physical locations via a mobile device, accessing content items or other interactions. Information describing these actions is stored in the action log 320. Additional examples of interactions with objects on the social networking system 240 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 240 as well as other applications operating on the social networking system 240. For example, the action log 320 stores a user's interactions with notifications and with content included in the notifications, such as a link. In some embodiments, data from the action log 320 is used to infer interests or preferences of the user, augmenting the interests included in the user profile and allowing a more complete understanding of user preferences.

The action log 320 may also store user actions taken on external websites, such as third party website 230. For example, an e-commerce website that primarily sells sporting equipment at bargain prices may recognize a user of a social networking system 240 through social plug-ins that enable the e-commerce website to identify the user of the social networking system 240. Because users of the social networking system 240 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

In one embodiment, an edge store 330 stores the information describing connections between users and other objects on the social networking system 240 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 240, such as expressing interest in a page on the social networking system 240, sharing a link with other users of the social networking system 240, and commenting on posts made by other users of the social networking system 240.

The edge store 330 stores information describing characteristics of edges, such as affinity scores for objects, interests, and other users. Affinity scores may be computed by the social networking system 240 over time to approximate a user's affinity for an object, interest, and other users in the social networking system 240 based on the actions performed by the user. A user's affinity may be computed by the social networking system 240 over time to approximate a user's affinity for an object, interest, and other users in the social networking system 240 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 330, in one embodiment. In some embodiments, connections between users may be stored in the user profile store 305, or the user profile store 305 may access the edge store 330 to determine connections between users.

Data stored in the user profile store 305, the content store 310, the action log 320, and the edge store 330 enables the social networking system 240 to generate a social graph that uses nodes to identify various objects and edges connecting nodes to identify relationships between different objects resulting from an action that was performed by one of the nodes on the other node. Building upon this understanding of a social graph, which comprises nodes and edges, the social graph can be "opened" by enabling third-party developers and external systems 240 to define objects and actions that imitate real-world interactions to be published to the social graph. For example, as users of the social networking system 240 use third party websites 230, their actions external to the social networking system 240 may be captured and reported to the social networking system 240. Hence, a third party website 230 reports a user's interaction according to structured actions and objects in the social graph. The action logger 315 interprets the received interaction according to the definitions of the action and object maintained by the social networking system 240, allowing the interaction to be included in the social graph.

The ranking module 335 generates ranking scores of objects, users, and/or actions data objects for a user providing input to the social networking system 240, such as through a composer interface as shown in FIG. 1. For example, the ranking module 335 generates rankings of actions based on data associated with a user providing input, which is used to present candidate actions to the user. In one embodiment, the ranking module 335 generates scores for different actions and ranks the actions based on their associated scores. Various criteria may be used to generate the scores for actions. For example, historical information from the action log 220 identifying actions previously performed by the user, identifying actions associated with a location associated with the user, or any other suitable data may be used to rank actions for the user providing input. Hence, a ranking of actions may account for the context of information received from the user, which includes the user, a location associated with the user, the time when the input was received, and any other information.

Actions having similar contexts are retrieved from the action log 220 and ranked based on the similarity between their contexts and the context of the received input. Additionally, actions performed by additional users connected to the user providing input may be used to generate the ranking of actions. Further, actions performed by global users of the social networking system 240 associated with a location associated with the user and/or occurring at a time within a threshold time of the social networking system 240 receiving input from the user may be used to perform a ranking of actions. Additional examples of factors for ranking actions include actions performed by other users connected to the user, affinities between the user and other users or objects associated with actions, actions previously performed by the user, interests associated with the user, frequency of interaction between the user and other users, affinities by users connected to the user for objects, or other suitable information. Ranking of actions is further disclosed in U.S. patent application Ser. No. 13/239,340, filed on Sep. 21, 2011, which is incorporated by reference herein in its entirety. In addition to ranking actions, the ranking module 335 may also generate rankings for objects. For example, when a user selects an action, the selected action is used to identify a ranking of objects associated with the action. The ranking of objects may be based on one or more of the above described factors.

Figure 4:
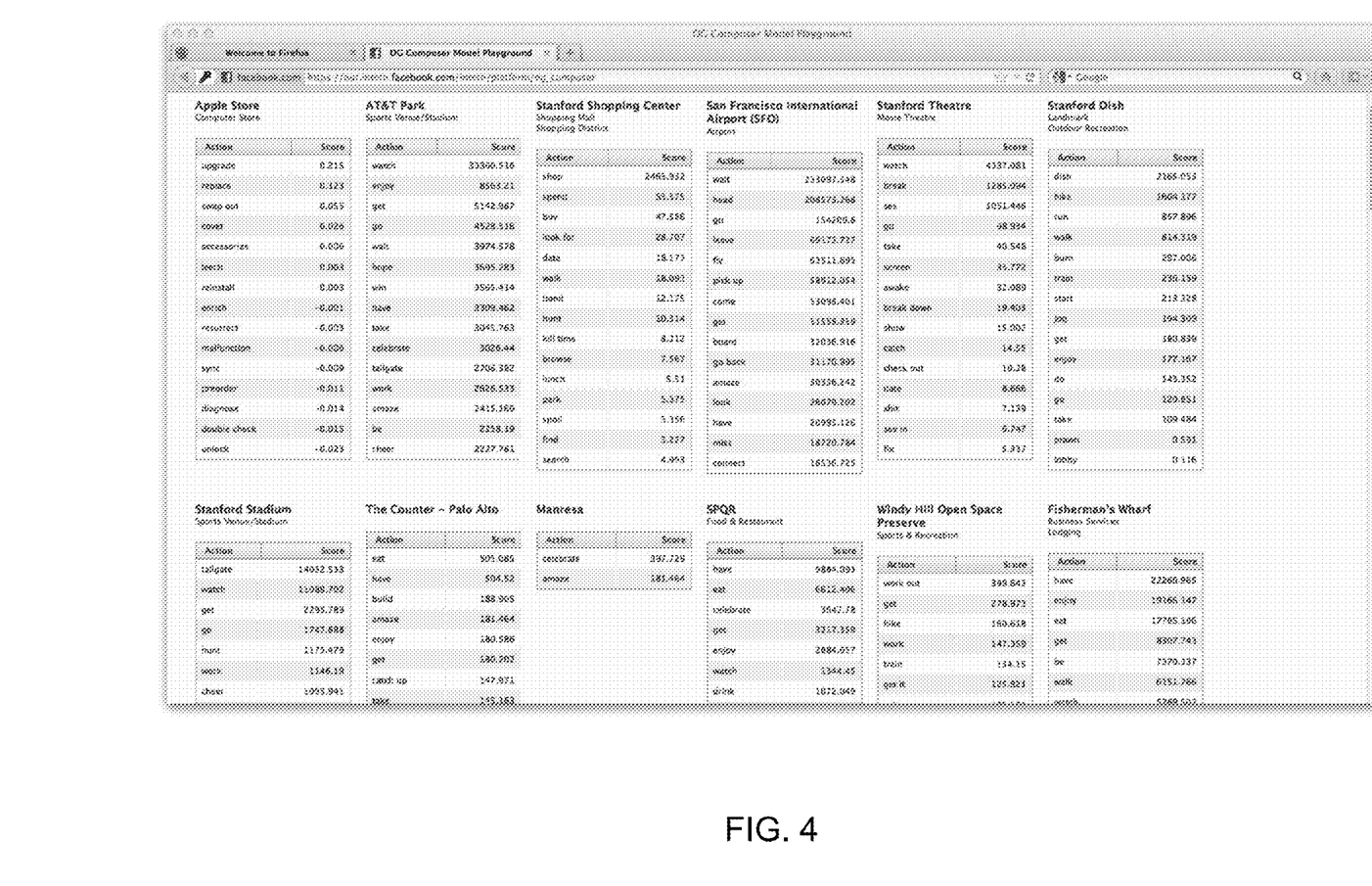
FIG. 4 is an example of a screen showing ranked actions associated with locations, in accordance with an embodiment.

FIG. 4 shows examples of rankings generated by the ranking module 335 ranking actions associated with different locations. As shown in FIG. 4, different rankings may be generated for different locations. For example, the rankings in FIG. 4 are based on actions associated with different locations performed by all social networking system users. The rankings may associate different weights with actions performed by different users at a location. For example, actions associated with users connected to the user providing input and/or by the user providing the user may have an increased weighting so that actions more likely to be relevant to the user providing the input are ranked higher. The rankings may reflect the frequency with which users of the social networking system 240 performed different actions while associated with the different locations. Hence, different candidate actions are presented to the user when the user is at different locations. While FIG. 4 shows examples of rankings for actions associated with locations, other types of rankings may be generated by the ranking module 335.

The input matching module 340 includes data for generating a composer interface, as shown in FIG. 1A, which is communicated to a client device 210 via the web server 345 and the network 220. Input received from a user via the composer interface is communicated to the input matching module 340, which identifies one or more candidate actions from the ranking module 335 based on the received input. For example, the input matching module 340 identifies actions matching, or otherwise associated with, the received input. As described above in conjunction with FIG. 1, the received input may be text data and portions of the text data may be compared to rankings of actions generated from the ranking module 335 based on the user's identify as the text data is received. Comparison of text data to stored data as the text data is received is further described in U.S. Pat. Nos. 8,239,364 and 8,316,056, which are each incorporated by reference herein in their entirety. In various embodiments, the input matching module 340 may receive input in various languages and identify actions and/or objects having the same language as the received input.

Additional information may be used to identify candidate actions for presentation to the user along with the received input. Examples of additional information used to identify candidate actions include the user providing the input, a location associated with the user providing the input, the time at which the input was provided, or other suitable information. If the user does not identify a location with the received input, the input matching module 340 may infer the user's location based on content in which the user was tagged, information in the user's user profile, or other data associated with the user. Based on the location associated with the user, the input matching module 340 identifies candidate actions from the ranking of actions associated with the location. For example, the input matching module 340 identifies actions having at least a threshold ranking or having the highest rankings as candidate actions.

In addition to using data associated with the user, the input matching module 340 may receive information from one or more sensors of the client device 210 from which input was received. For example, an audio footprint is derived from audio data received from a microphone of the client device 210 and compared to audio footprints associated with locations in the content store 310 to determine a location of the client device 210. Using the inferred location, the input matching module 340 identifies candidate actions from the ranking module 335. Alternatively, positing sensors in a client device 210 is received and used to identify candidate actions. Data from other sensors of a client device 210 (e.g., an image capture device, a light sensor, etc.) may also be received, subject to user-specified privacy settings, with the input and used to identify candidate actions.

Candidate actions matching, or associated with, input received via the composer interface are presented to the user via the composer interface, allowing the user to select an action associated with the input. In one embodiment, when the user selects an action, the input matching module 340 identifies one or more candidate objects matching input received after selection of the action from rankings of objects maintained by the ranking module 335. The candidate objects may be identified based on the selected action, and one or more of the factors used for identifying candidate actions described above may also be used to identify candidate objects. In one embodiment, the candidate objects are selected based at least in part on information associated with the selected action. For example, a selected action may be associated with a real-time signal, so the candidate objects account for the time when the action was selected. As an example, if the selected action is "watch," the candidate objects may include shows on television or movies playing in theaters at the time when "watch" was selected; as another example. Alternatively, the candidate objects may be selected based on objects selected by other social networking system users selecting the same action within a threshold time of the user selecting an action. Hence, a user may select an object associated with the input received from the composer interface as well as an action, allowing the received input to be readily identified and associated with an action maintained by the action log 320.

For example, when a user provides a post via the composer interface, as the user provides text input, the input matching module 340 identifies candidate actions associated with the received text input based on a location associated with the user and/or other information associated with the user. The candidate actions are presented to the user via the composer interface, allowing the user to select an action that is associated with the post. This allows the social networking system 240 to more easily integrate the post into a maintained social graph for selecting content for the user. Additionally, identifying structured data associated with a post allows specialized targeting of advertisements based on graph data to be determined based on events occurring outside of the social networking system 240 but described in a post.

Associating an action with content provided by a user via the composer interface allows the social networking system 240 to analyze content provided by the user over time. For example, the action logger 315 may identify content previously provided to the social networking system 240 and associated with the same action as content provided by the user. The identified prior content may be aggregated to provide information about the frequency with which the user has provided content associated with the same action or to provide data about objects or other users associated with the content associated with the same action. For example, if a user associates text content in a post with the action "eating," the action logger 315 may identify additional "eating" actions from the action log 320 and identify additional users associated with the "eating" actions, objects associated with the "eating" actions (e.g., prior objects the user ate), locations associated with the "eating" actions, or other suitable information. This information aggregated from the action log 320 may be presented to the user as story in a news feed presented to the user providing content, presented as a message to the user providing content, or via any other suitable communication channel.

Additionally, the social networking system 240 may identify users, applications, or other content based on the action and/or object associated with content received from a user. For example, based on an action associated with received content, the social networking system 240 identifies additional content items also associated with the action, such as pages associated with locations or applications, and identifies the content items to the user via a message, a story included in a news feed, additional content appended to the user-supplied content, or any other suitable manner. Further, the social networking system 240 may allow third party websites 230 or applications to associate themselves with actions or objects, and include references to content from the third party website 230 or to the application in addition to the content provided by the user. For example, if the user associates an action of "watching" and an object of a television show, a link to view episodes of the television show may be presented along with the content provided by the user. Hence, if a user associates an action and/or object with input provided via the composer interface, an entity associated with the action and/or object may provide links or other content to the user that are included in a post generated from the user's input.

The web server 345 links the social networking system 240 via the network 220 to the one or more client devices 210, as well as to the one or more third party websites 230. The web server 240 serves web pages, as well as other web-related content, such as JAVA®, FLASH®, XML and so forth. The web server 345 may provide the functionality of receiving and routing messages between the social networking system 240 and the client device 210, for example, instant messages, queued messages (e.g., email), text and SMS (short message service) messages, or messages sent using any other suitable messaging technique. A user may send a request to the web server 345 to upload information, for example, images or videos that are stored in the content store 210. Additionally, the web server 345 may provide application programming interface (API) functionality to send data directly to native client device operating systems, such as IOS®, ANDROID™, WEBOS® or RIM.

Obtaining Structured Data from a Social Networking System User

Figure 5:
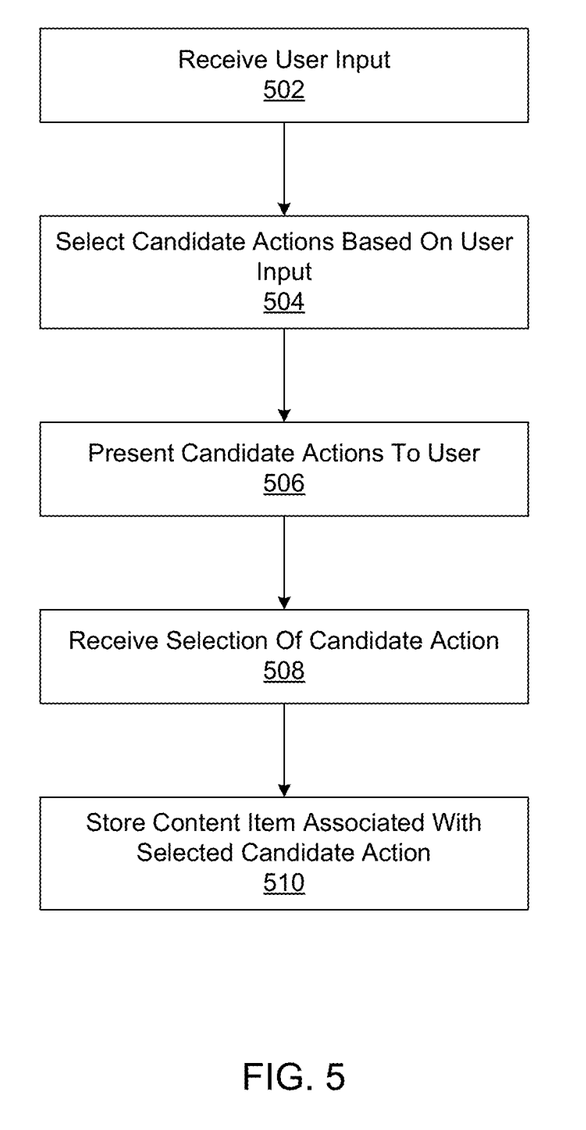
FIG. 5 is a flowchart of a process of associating structured data maintained by a social networking system with received input, in accordance with an embodiment.

FIG. 5 is a flowchart of one embodiment of a process of associating structured data maintained by a social networking system 240 with received input. The social networking system 240 receives 502 input from a user, such as content for distribution to other users of the social networking system 240 by being posted to the social networking system 204. For example, the received input is unstructured text data received via a composer interface. The received input may be text input, audio input, and may include additional information such as location information. In some embodiments, information from one or more sensors of a client device 210 may be received 502, subject to user privacy settings.

Based on the received input, the social networking system 240 selects 504 one or more candidate actions associated with objects stored by the social networking system 240. The actions stored by the social networking system each indicate a relationship between objects maintained by the social networking system. For example, an action associated with an object describes a relationship between a user and an object. In one embodiment, the social networking system 240 also selects one or more candidate objects stored by the social networking system based on the received input. For example, the social networking system 240 selects 504 candidate actions matching at least a portion of the received input; similarly, candidate objects (including users) matching at least a portion of the received input may be selected. Candidate actions and/or objects may be selected 504 based on a ranking, which is further described above in conjunction with FIG. 3.

The one or more candidate actions are presented 506 to the user. In one embodiment, the one or more candidate actions are presented 506 along with the input in the composer interface. The social networking system 240 receives 508 a selection of one or more candidate actions and stores 510 an association between the received input, a user identifier associated with the user, and the selected one or more candidate actions. For example, the social networking system 240 stores 510 a post generated from received text input and associates the post with the selected candidate action and with an identifier of the user selecting the candidate action. Similarly, a selection of one or more candidate objects may be received, which are associated with the received input and user identifier of the user selecting the one or more candidate objects and stored 510 by the social networking system 240. The stored received content may then be presented to additional social networking system users. The associated candidate actions or objects may also be identified when presenting the content to the additional social networking system users.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    storing, by a social networking system, a plurality of locations and a plurality of actions;
    receiving, in a composer user interface, new content input by a user of the plurality users of the social networking system for posting to the social networking system;
    selecting candidate locations from the plurality of locations based on the new content input by the user, wherein selecting the candidate locations comprises:
        selecting a group of locations from the plurality of locations, the locations in the group matching at least a portion of the new content input by the user,
        ranking the locations in the group based on data associated with the user, and
        selecting the candidate locations based at least in part on the ranking;
    selecting candidate actions from the plurality of actions based on the new content input by the user, wherein selecting the candidate actions comprises:
        selecting a group of actions from the plurality of actions, the actions in the group matching at least a portion of the new content,
        ranking the actions in the group based on the data associated with the user, and
        selecting the candidate actions based at least in part on the ranking;
    providing, in the composer user interface, options for the user to access at least some of the candidate locations and at least some of the candidate actions;
    receiving, from the user, a request to access at least some of the candidate locations and at least some of the candidate actions through the options;
    in response to the received request, providing, in the composer user interface, a plurality of the candidate locations and a plurality of the candidate actions for display to the user for the user to select a candidate location and a candidate action;
    receiving a selection of a candidate location and a selection of a candidate action from the user;
    adding the selected candidate location and the selected candidate action to the new content input by the user for posting to the social networking system; and
    storing in the social networking system an association between the new content, a user identifier associated with the user, the selected candidate location, and the selected candidate action.

2. The method of claim 1, wherein the data associated with the user by the social networking system is selected from a group consisting of: actions performed by other users connected to the user, affinities between the user and other users or objects, actions previously performed by the user, interests associated with the user, a frequency of interaction between the user and other users, affinities by users connected to the user for objects, and any combination thereof.

3. The method of claim 1, wherein selecting candidate actions from the plurality of actions based on the new content input by the user further comprises:
    determining a location associated with the user; and
    selecting the candidate actions based at least in part on the new content by the user and the location associated with the user.

4. The method of claim 3, wherein selecting the candidate actions based at least in part on the new content by the user and the location associated with the user further comprises:
    ranking the plurality of actions stored by the social networking system based on the location associated with the user; and
    selecting the candidate actions based at least in part on the ranking.

5. The method of claim 1, further comprising:
    presenting, by the social networking system, the new content to one or more additional users of the social networking system connected to the user.

6. The method of claim 1, wherein selecting candidate actions from the plurality of actions comprises:
    selecting the candidate actions from the plurality of actions based on the selection of the candidate location received from the user such that different candidate actions are selected depending on the candidate locations selected.

7. A method comprising:
    storing, by a social networking system, a plurality of locations and a plurality of objects;
    receiving, in a composer user interface, new content input by a user of the social networking system for distribution by the social networking system to other users of the social networking system;
    selecting candidate locations from the plurality of locations based on the new content input by the user, wherein selecting the candidate locations comprises:
        selecting a group of locations from the plurality of locations, the locations in the group matching at least a portion of the new content input by the user,
        ranking the locations in the group based on data associated with the user, and
        selecting the candidate locations based at least in part on the ranking;
    selecting candidate objects from the plurality of objects based on the new content input by the user, wherein selecting the candidate objects comprises:
        selecting a group of objects from the plurality of objects, the objects in the group matching at least a portion of the new content input by the user,
        ranking the objects in the group based on the data associated with the user by the social networking system, and
        selecting the candidate objects based at least in part on the ranking;
    providing, in the composer user interface, options for the user to access at least some of the candidate locations and at least some of the candidate objects;
    receiving, from the user, a request to access at least some of the candidate locations and at least some of the candidate objects through the options;
    in response to the received request, providing, in the composer user interface, a plurality of the candidate locations and a plurality of the candidate objects for display to the user for the user to select a candidate location and a candidate object;
    receiving a selection of a candidate location and a selection of a candidate object from the user;
    adding the selected candidate location and the selected candidate object to the new content input by the user for distribution by the social networking system; and storing, in the social networking system, an association between the new content, a user identifier associated with the user, the selected candidate location, and the selected candidate object.

8. The method of claim 7, wherein the data associated with the user by the social networking system is selected from a group consisting of: actions performed by other users connected to the user, affinities between the user and other users or objects, actions previously performed by the user, interests associated with the user, a frequency of interaction between the user and other users, affinities by users connected to the user for objects, and any combination thereof.

9. The method of claim 7, selecting candidate locations from the plurality of locations based on the new content input by the user further comprises:
   determining a location associated with the user; and
   selecting the candidate locations based at least in part on the new content input by the user and the location associated with the user.

10. The method of claim 7, wherein selecting candidate objects form the plurality of objects based on the new content input by the user further comprises:
   determining a location associated with the user; and
   selecting the candidate objects based at least in part on the new content input by the user and the location associated with the user.

11. The method of claim 7, further comprising:
   presenting, by the social networking system, the new content to one or more additional users of the social networking system connected to the user.

12. The method of claim 7, wherein selecting candidate objects from the plurality of objects comprises:
   selecting the candidate objects from the plurality of objects based on the selection of the candidate location received from the user such that different candidate objects are selected depending on the candidate locations selected.

13. A non-transitory computer readable medium storing executable computer program instructions, the computer program instructions comprising instructions that when executed cause a computer processor to:
   store, by a social networking system, a plurality of locations and a plurality of actions;
   receive, in a composer user interface, new content input by a user of the plurality users of the social networking system for posting to the social networking system;
   select candidate locations from the plurality of locations based on the new content input by the user, wherein the computer program instructions for selecting the candidate locations comprise instructions that when executed cause the computer processor to:
      select a group of locations from the plurality of locations, the locations in the group matching at least a portion of the new content input by the user,
      rank the locations in the group based on data associated with the user, and
      select the candidate locations based at least in part on the ranking;
   select candidate actions from the plurality of actions based on the new content input by the user, wherein the computer program instructions for selecting the candidate actions comprise instructions that when executed cause the computer processor to:
      selecting a group of actions from the plurality of actions, the actions in the group matching at least a portion of the new content,
      ranking the actions in the group based on the data associated with the user, and
      selecting the candidate actions based at least in part on the ranking;
   provide, in the composer user interface, options for the user to access at least some of the candidate locations and at least some of the candidate actions;
   receive, from the user, a request to access at least some of the candidate locations and at least some of the candidate actions through the options;
   in response to the received request, provide, in the composer user interface, a plurality of the candidate locations and a plurality of the candidate actions for display to the user for the user to select a candidate location and a candidate action;
   receive a selection of a candidate location and a selection of a candidate action from the user;
   add the selected candidate location and the selected candidate action to the new content input by the user for posting to the social networking system; and
   store in the social networking system an association between the new content, a user identifier associated with the user, the selected candidate location, and the selected candidate action.

14. The computer readable medium of claim 13, wherein the computer program instructions for selecting candidate actions from the plurality of actions based on the new content input by the user further comprise instructions that when executed cause the computer processor to:
   determine a location associated with the user; and
   select the candidate actions based at least in part on the new content by the user and the location associated with the user.

* * * * *

UNITED STATES PATENT AND TRADEMARK OFFICE
CERTIFICATE OF CORRECTION

PATENT NO. : 10,277,642 B2
APPLICATION NO. : 13/764632
DATED : April 30, 2019
INVENTOR(S) : Robert Taaffe Lindsay et al.

Page 1 of 1

It is certified that error appears in the above-identified patent and that said Letters Patent is hereby corrected as shown below:

In the Claims

Column 13, Line 14, Claim 1, delete "by a user of the plurality users of the" and insert -- by a user of the --.

Column 15, Line 45, Claim 13, delete "by a user of the plurality users of the" and insert -- by a user of the --.

Signed and Sealed this
Nineteenth Day of November, 2019

Andrei Iancu
*Director of the United States Patent and Trademark Office*